3,117,156
PREPARATION OF ACETOACETIC ACID ESTERS FROM DIKETENE AND ALCOHOL IN THE PRESENCE OF AN ACID CATALYST
Hans Peter Keller and Christoph Zinsstag, Visp, Switzerland, assignors to Lonza Ltd., Gampel, Switzerland
No Drawing. Filed Aug. 8, 1960, Ser. No. 47,953
Claims priority, application Switzerland Aug. 13, 1959
7 Claims. (Cl. 260—483)

The invention relates to the preparation of acetoacetic esters.

Such esters are prepared by reaction of diketene with alcohols according to the equation

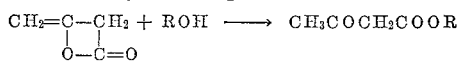

Due to the reactivity of the diketene, a number of side reactions may take place which can considerably affect the economy of the process. For instance, the diketene may polymerize to dehydroacetic acid, or various decomposition products may be formed, such as acetone.

Various procedures have been proposed to steer the reaction into the desired direction, whereby basic or acid catalysts have been used. Said procedures were unsatisfactory for several reasons.

The use of acid catalysts such as sulfuric acid, phosphoric acid, toluenesulfonic acid had the drawback that the control of the reaction at the required high temperatures was very difficult; therefore, the reaction had to be carried out in an inert solvent or with a large excess of alcohol. The relatively high volatility and the necessary recovery of the solvent or alcohol rendered the process very expensive.

Subsequently, it was proposed to use basic catalysts such as triethylamine, pyridine, triethanolamine, sodium acetate, secondary or tertiary sodium phosphate, sodium silicate, sodium sulfite, borax, sodium stearate or the like. The activity of such catalysts allowed of operating at temperatures where most solvents do not yet evaporate. However, at such low temperatures enrichment of diketene could take place which sometimes produced explosive reaction. For this reason, it was proposed to carry out the reaction with reflux. An additional drawback of the use of basic catalysts was that they did not esterify acetic acid, formed during the reaction from the acetic anhydride always present in commercial diketene; the acetic acid remained in the reaction mixture and could be removed therefrom subsequently only with difficulty by means of complicated methods.

The present invention overcomes all said difficulties and allows, in addition, to obtain crude acetoacetic ester of higher purity.

The invention consists in a process where diketene, alcohol, and an acid catalyst are introduced into the diketene-alcohol reaction product heated at reaction temperature, thereby simultaneously distilling off the by-products having a boiling point below said reaction temperature, together with the unreacted alcohol, from the formed crude acetoacetic ester.

The components of the reaction are simultaneously added to the reaction medium, either separately or jointly. In the latter case, they are mixed at a temperature at which reaction does not yet take place, for instance at a temperature of 10 to 40° C. (room temperature), and introduced into the reaction medium which is heated at the reaction temperature which is between about 90° C. and the boiling point of the formed acetoacetic ester, preferably about 120 to 140° C.

As alcohol, we use preferably aliphatic alcohols such as methanol, ethanol, isopropanol, butanol. Preferably, diketene and alcohol are employed in such a ratio that, on the one hand, the desired acetoacetic ester is formed, and on the other hand, the acetic acid formed from the impurities of the diketene is converted to the corresponding acetic ester. The preferred mol ratio of diketene to alcohol is between 1:1 and 1:1.15.

Suitable catalysts are, for instance, sulfuric acid, phosphoric acid, sulfonic acids such as paratoluenesulfonic acid. They are preferably employed in amounts of 1 mole per 300–600 moles of diketene.

The heat required for maintaining and if necessary for obtaining the reaction temperature and removing the volatile by-products from the reaction product is furnished by the exothermic reaction between diketene and alcohol. The process of the invention has the great advantage to use the heat produced by the reaction for the separation of the volatile by-products.

The optimum reaction conditions are maintained by adjusting the amount of unreacted reaction mixture in relation to the warm reaction product. In carrying out the process, we adjust the amounts of freshly introduced reactants and reaction product remaining in the system preferably so that 1 liter/hour of the starting diketene-alcohol mixture is introduced into 0.3 to 0.7 liter of the reaction medium.

The invention may be carried out as a batch process or continuously. In the latter case, the starting mixture may be continuously formed by mixing diketene, alcohol, and the catalyst, for instance sulfuric acid, and introduced into a reaction vessel equipped with a distillation column, which is maintained at reaction temperature and contains the reaction product. In the reaction vessel, acetoacetic ester is formed, and the volatile by-products of the reaction, such as acetic ester and acetone, are distilled off in the head of the column at temperatures of 50–80° C. together with unreacted alcohol. The product remaining in the vessel consists essentially of acetoacetic ester and less volatile compounds; it is continuously withdrawn and, if desired, heated at 90–140° C. during 1 to 20 minutes and subjected to an after-reaction so as to convert any still unreacted diketene. The process of the invention allows of operating under such temperature conditions that high rates of reactions are obtained, which, in turn, makes it possible to use relatively small apparatus. In this way, the residence time of the reactants in the reaction zone at elevated temperatures may be so shortened as to prevent losses by polymerization or decomposition of the heat sensitive starting and end products.

The following examples illustrate the invention.

*Example 1*

Into a reaction vessel equipped with a fractionation column and containing 1000 cc. of the reaction product (92–95% crude acetoacetic ester) preheated to 125° C., there is introduced per hour a mixture consisting of 1690 g. of diketene (97–98%), 675 g. of methanol, and 3.4 g. of concentrated sulfuric acid, which corresponds to an introduction rate of about 40 cm.³/min. Hereby, the temperature remains constant at 125° C. without supply of external heat, due to the developed heat of reaction. From the head of the fractionating column, which has a temperature of 50–60° C., there is at the same time withdrawn 68 g. per hour of a low boiling mixture which consists essentially of about 45 percent of acetone, 35 percent of methyl acetate, and 20 percent of methanol. The heat required for heating the starting mixture to reaction temperature and for distilling the high volatile by-products is initially supplied from the outside. The heat supply is discontinued when the alcohol-diketene reaction furnishes the amount of heat required for heating the starting mixture and for the distillation.

The withdrawn reaction mixture passes an after-reaction system wherein the components are brought to complete reaction at a temperature of about 100° C. and an average residence time of about 10 minutes. In this way, 2305 g. per hour of crude acetoacetic ester containing about 95 percent of acetoacetic methyl ester are obtained. From said crude ester, an about 99% acid-free ester is directly obtained by a single vacuum fractionation. Therefore, the yield of acetoacetic methyl ester in the raw mixture is 94 percent, calculated on diketene, and 88 percent, calculated on methanol.

*Example 2*

Into the same apparatus as used in Example 1, still containing 1000 g. of the reaction product of ethyl alcohol and diketene, there is introduced per hour at 125° C. a mixture consisting of 1580 g. of diketene (97–98%), 925 g. of ethyl-alcohol and 4.8 g. of sulfuric acid. From the head of the column, 50 g. of a mixture are withdrawn, which consists mainly of about 50 percent of acetone, 37 percent of ethylacetate, and ethylalcohol. There are obtained 2460 g. of crude ester with a content of 94% of acetoacetic ethyl ester. By fractionation in a vacuum, pure ester of 99.8 percent free of acids is obtained. The yield of ester in the crude mixture is 93%, calculated on diketene, and 87.5% calculated on ethyl alcohol.

*Example 3*

Similarly to Example 1, a mixture consisting of 1530 g. of diketene (98%), 1165 g. of isopropylalcohol, and 5.8 g. of concentrated sulfuric acid per hour are introduced in a reaction vessel containing 1000 g. of raw acetoacetic acid isopropyl ester from a preceding run heated at 125° C. Thereby, there are obtained per hour 45 g. of volatile components, which are withdrawn at the head of the column, and 2650 g. of crude ester, from which are recovered by continuous vacuum fractionation 2340 g. of acetoacetic acid isopropyl ester (99.9% content) free of acid. The yield of pure ester is, therefore, 91 percent, calculated on diketene, and 83.7 percent, calculated on isopropyl alcohol.

*Example 4*

A mixture consisting of 1880 g. of diketene, 743 g. of methanol, 318 g. of the first run from the fractionation, which contain, in addition to volatile components, about 75 percent of acetoacetic acid methyl ester, and 5.3 g. of concentrated sulfuric acid were passed per hour into the apparatus described in Example 1, which contained 1000 g. of raw acetoacetic acid methyl ester from a previous run. There were obtained 76 g./hour of volatile products and 2870 g./hour of crude ester. By continuous vacuum fractionation, the latter yields 2300 g./hour of acetoacetic acid methyl ester of 99.8% purity, which was free of acids. The first run of the fractionation was returned to the starting mixture. The yield of pure ester was 90.5 percent, calculated on diketene, and 85.5 percent, calculated on methanol.

As shown by the examples, a substantially pure end product is obtained from the crude acetoacetic esters by a single fractionation under reduced pressure.

We claim:

1. A method for the continuous preparation of acetoacetic esters comprising passing continuously diketene, a lower aliphatic saturated alcohol and an acid catalyst into a reaction zone containing a substantially constant amount of the reaction product of a preceding reaction of said components heated at a reaction temperature which is higher than the boiling point of said alcohol and between about 90 and 140° C., thereby simultaneously distilling off excess alcohol and by-products having a boiling point below said reaction temperature, and continuously removing formed crude acetoacetic ester of said alcohol from said reaction zone.

2. The method as claimed in claim 1, comprising subjecting the withdrawn crude acetoacetic ester to a heat treatment of about 90 to 140° C. for a time of about 1 to 20 minutes, and then fractionating said ester.

3. The method as claimed in claim 1, wherein said acid catalyst is a member of the group consisting of sulfuric acid, phosphoric acid, and organic sulfonic acids.

4. The method as claimed in claim 1, comprising mixing the reactants at temperatures below reaction temperature prior to their passage into the reaction zone.

5. The method as claimed in claim 4, wherein the reactants are mixed at a temperature of about 10 to 40° C.

6. The method as claimed in claim 1, comprising introducing in the reaction zone one liter per hour of the reaction mixture for each 0.3 to 0.7 liter of reaction product contained in said zone.

7. The method as claimed in claim 1, wherein the heat required for the distillation of said alcohol and by-products is furnished substantially completely by the heat of the exothermic reaction of the reactants.

References Cited in the file of this patent

UNITED STATES PATENTS

| | | |
|---|---|---|
| 2,228,452 | Gleason | Jan. 14, 1941 |
| 2,351,366 | Pohl et al. | June 13, 1944 |